United States Patent [19]

Maselli et al.

[11] Patent Number: 5,707,042
[45] Date of Patent: Jan. 13, 1998

[54] DEVICE FOR SHIFTING THE SEATS OF A BALL VALVE

[75] Inventors: Paolo Maselli, Modugno; Andrea Florio, Palo Del Colle, both of Italy

[73] Assignee: Nuovo Pignone S.p.A., Florence, Italy

[21] Appl. No.: 707,616

[22] Filed: Sep. 5, 1996

[30] Foreign Application Priority Data

Sep. 14, 1995 [IT] Italy ................................ MI95A1911

[51] Int. Cl.⁶ ........................................................ F16K 5/06
[52] U.S. Cl. ........................................ 251/315.12; 251/314
[58] Field of Search ........................... 251/314, 315.1, 251/315.11, 315.12

[56] References Cited

U.S. PATENT DOCUMENTS

| 3,912,220 | 10/1975 | Vasicek . |
| 4,815,701 | 3/1989 | Stone . |

FOREIGN PATENT DOCUMENTS

| 231775 | 2/1964 | Australia | 251/315.12 |
| 0109806 | 5/1984 | European Pat. Off. . | |
| 0225752 | 6/1987 | European Pat. Off. . | |
| 21125045 | 11/1971 | Germany . | |
| 2632397 | 1/1978 | Germany . | |
| 2188709 | 10/1987 | United Kingdom | 251/315.12 |
| 2275757 | 9/1994 | United Kingdom . | |

OTHER PUBLICATIONS

Patent Abstracts of Japan vol. 11, No. 149, May 12, 1987 and JP-A-61 282674, Dec. 12, 1986 (Abstract).

*Primary Examiner*—John Fox
*Attorney, Agent, or Firm*—George P. Hoare, Jr.; Rogers & Wells

[57] ABSTRACT

An improved device for shifting the seats of a top entry ball valve, consisting of two identical portions, one for each valve seat, which are permanently interposed between the valve body and the relative seats; each portion comprises a stop ring made rigid with the valve body by first locking means, and a seat shifting second ring cooperating with a valve seat and movable axially by operating means into a withdrawn position to enable said valving element to be extracted or into an active position in which it is locked in position by second locking means. Preferred embodiments of said means are also described.

5 Claims, 2 Drawing Sheets

DEVICE FOR SHIFTING THE SEATS OF A BALL VALVE

This invention relates to a device which, integrated into the valve body, allows simple, rapid and reliable shifting of the seats of a top entry ball valve, ie in which the valving element is extracted from the top via an openable cap on the valve, so making valve maintenance extremely simple.

In the current state of top entry ball valves, one of the most critical aspects to be solved is known to be the shifting of the valve seats, ie the withdrawing and repositioning of the seal carrier rings or valve seats to allow the valving element to be removed and reinserted through the top, via the valve closure cap, for valve maintenance and repair.

In the current state of the art, said shifting is achieved by various implements, which are inserted into the top entry ball valve to push out the valve seats and hence be able to extract the valving element via the valve cap, so making all the valve components accessible.

However such solutions result in particularly difficult shifting, especially if this has to be done under uncomfortable site conditions in which it is not always possible and in any event requires considerable time, and in addition are onerous because shifting implements have to be available which, besides being complicated, are bulky and hence difficult to use and carry. The object of the present invention is to obviate said drawbacks by providing a device which is not complicated to use or to carry, and in particular ensures effective, simple, rapid and reliable shifting of the valve seats, and hence the removal of the valving element, particularly under site conditions, without removing it from the line into which it is connected.

This is substantially attained in that the device is permanently inserted into the ball valve as an integral part thereof, it being divided into two identical portions, one for each valve seat, and being interposed between the valve body and the relative seats.

Each portion of the device consists of a stop ring made rigid with the valve body to act as an external guide for the axial sliding under O-ring sealed conditions of a second ring of said portion which, coaxial to and cooperating with the relative valve seat or seal carrier ring by way of at least one O-ring, is moved together with said valve seat by friction, into a withdrawn position by the introduction of pressure into a first chamber bounded by said stop ring and by said second ring, or into an active position or is repositioned, by introducing pressure into a second chamber bounded by said valve body and by said second ring of the portion. When in this latter active position, said second ring of the portion is locked in position by second removable locking means.

Hence, the device for shifting the seats of a top entry ball valve comprising a valve body provided with an inlet duct, an outlet duct and an upper closure cap, the said inlet and outlet ducts being each provided with a seal carrier ring or valve seat, which are elastically pressed by series of springs against the spherical valving element, is characterised according to the present invention by consisting of, inserted permanently into said valve body as an integral part of the valve, two identical portions, one for each valve seat, which are interposed between said valve body and the relative valve seats, each portion of the device being formed from a stop ring which, made rigid with the valve body by first locking means, acts as an external guide for the axial sealed sliding, via an O-ring, of a seat shifting second ring of said portion which, coaxial to and cooperating with the relative valve seat via at least one O-ring, is moved, together with said valve seat by friction, by a first operating means, into a withdrawn position to enable said valving element to be extracted and, by a second operating means, into an active position or a repositioning of the valve seat, said seat shifting second ring being maintained in said active position by second removable locking means.

According to a preferred embodiment of the present invention, said first locking means for making said stop ring rigid with said valve body consist of two sectors which are inserted in a freely slidable manner into a nearly circumferential groove formed from two half-grooves provided in opposing positions in the valve body and in the stop ring. In this manner the locking effect is easily releasable by simply extracting the two sectors from the groove.

Again, it is apparent that the said sectors are designed to resist the shear stress to which the seat is subjected when under maximum differential pressure conditions. According to a preferred embodiment, said sectors are constructed of AISI 410 whereas the stop and seat shifting rings are of ASTM A 105.

According to a further preferred embodiment of the present invention, said first operating means for moving said seat shifting second ring and hence the relative valve seat into a withdrawn position to enable the valving element to be extracted, consists of a variable chamber bounded by said stop ring and by said seat shifting second ring, said chamber being subjectable to pressure via a feed and discharge channel provided within the stop ring.

Hence, according to a further preferred embodiment of the present invention, said second operating means for moving said seat shifting second ring and hence the relative valve seat into an active position or a repositioning of the valve seat, consists of a second variable chamber bounded by said valve body and by said seat shifting second ring, said second chamber being subjectable to pressure via a feed and discharge channel provided within the valve body.

Finally, according to a further preferred embodiment of the present invention, said second removable locking means for maintaining said seat shifting second ring in said active position consist of two sectors which are inserted freely slidable into a nearly circumferential groove consisting of two half-grooves provided in opposing positions in the valve body and in the seat shifting second ring.

The invention is described in detail hereinafter with reference to the accompanying drawings which illustrate a preferred embodiment thereof given by way of non-limiting example in that technical or constructional modifications can be made thereto but without leaving the scope of the present invention. For example, said stop ring can be secured to the valve body or its function can be performed by the valve body itself. Again, instead of being provided within the stop ring and valve body respectively, said first and second feed channel of said first and second chamber can both be provided within said seat shifting second ring, and said first channel can even be provided within the valve body itself.

Figure 1:
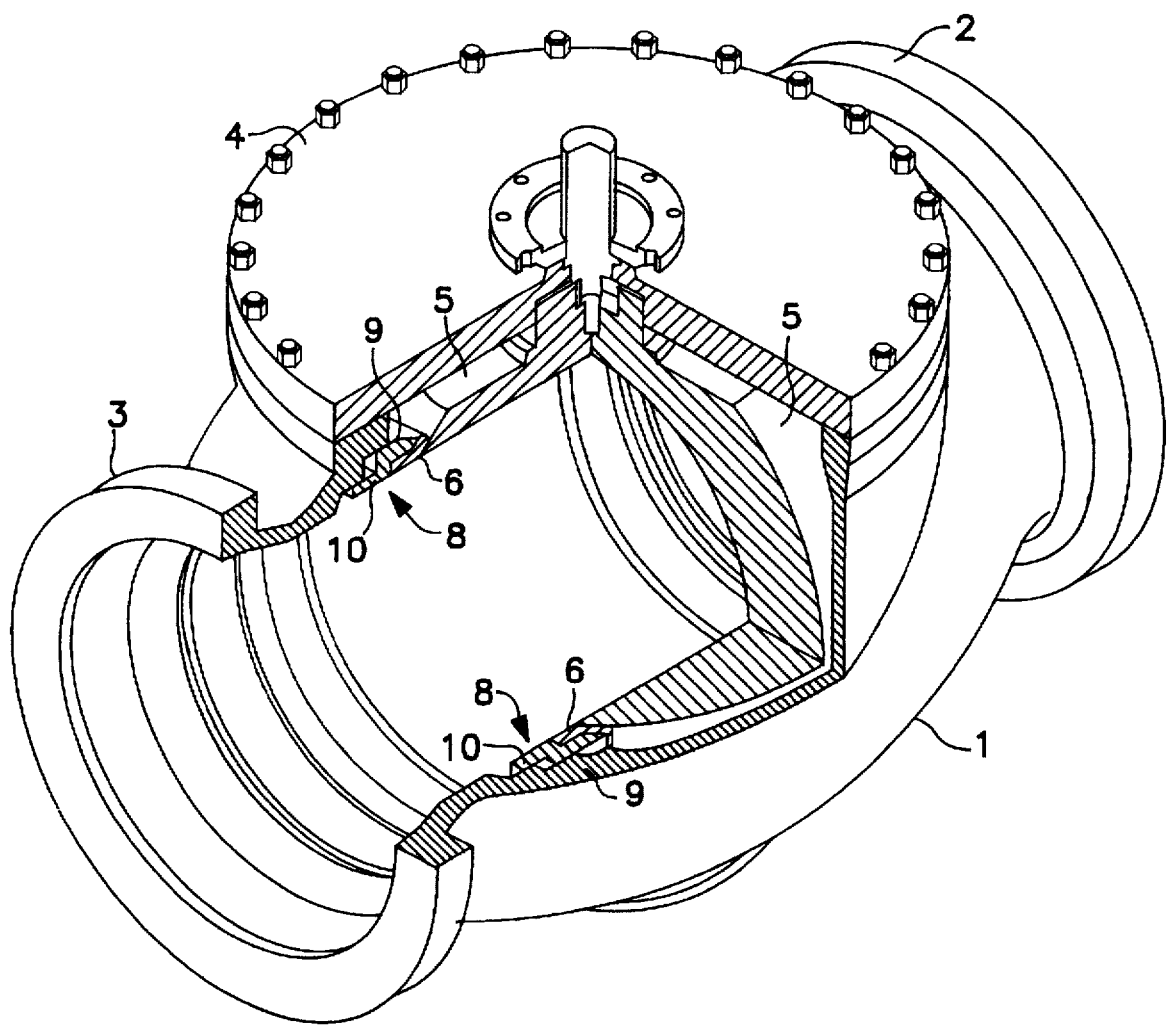
FIG. 1 is a partly sectional view of a top entry ball valve, using the seat shifting device according to the present invention.

In the figures the reference numeral 1 indicates the valve body of a top entry ball valve, which is provided with an inlet duct 2 and an outlet duct 3 which are positioned coaxially at opposite ends of the valve body 1. The valve body 1 is also provided upperly with an openable closure cap 4, through which the spherical valving element 5 can be extracted, this latter, housed within the valve body 1, cooperating with two opposing seal carrier rings or valve seats 6 situated in correspondence with said inlet and outlet ducts 2 and 3 (the figures only show that valve seat 6 on the same side as the outlet duct 3).

Figure 2:
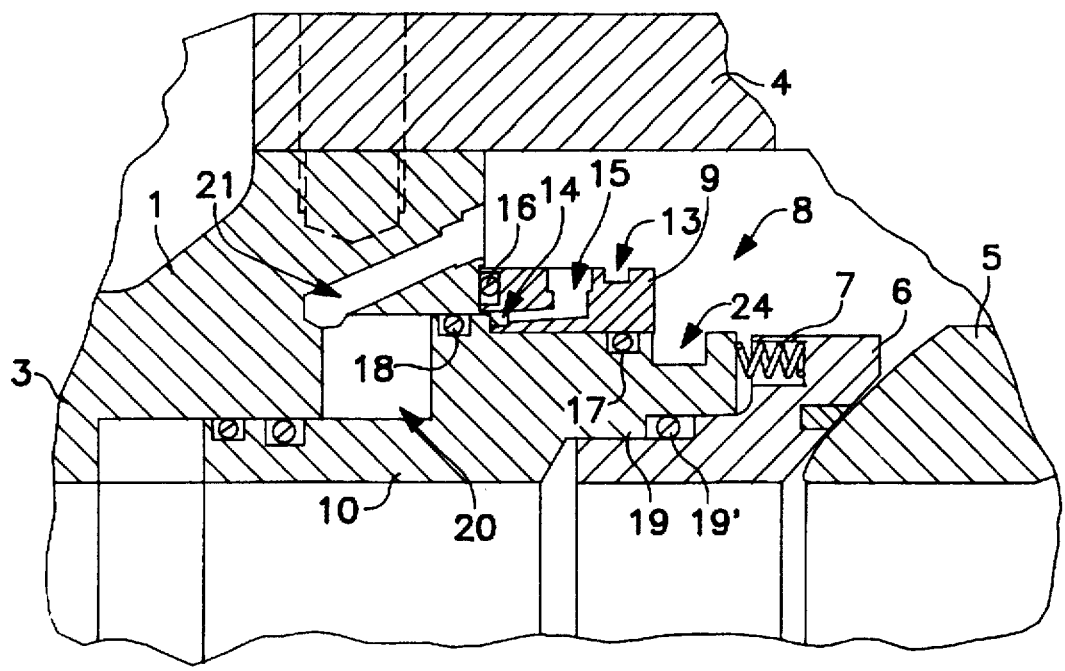
FIG. 2 is a considerably enlarged view of a partial vertical section through the valve of FIG. 1.
Figure 3:
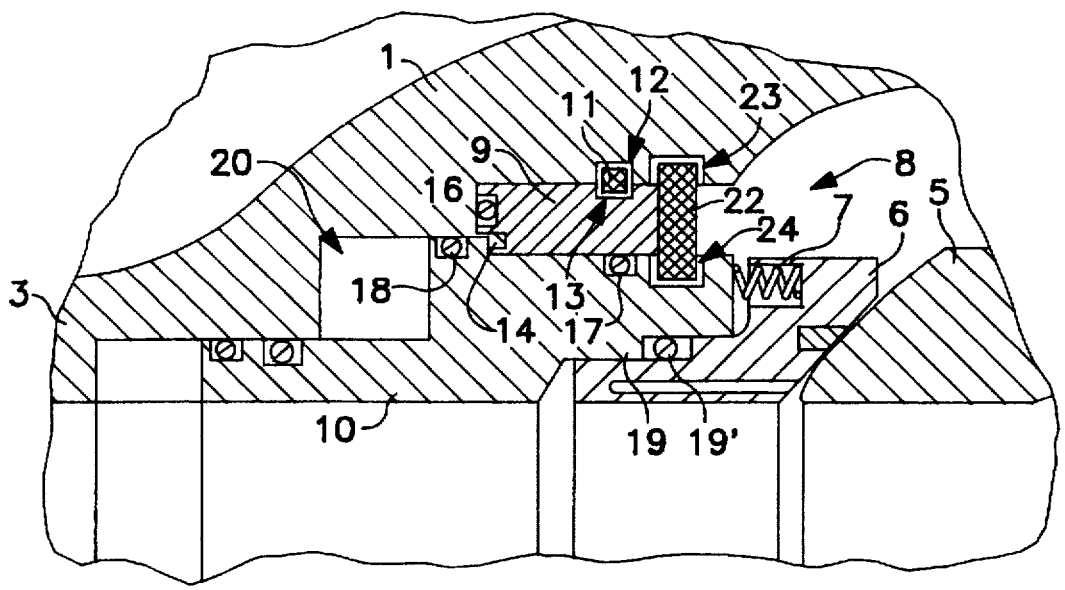
FIG. 3 is a section through FIG. 2 taken from above.

Each valve seat 6 is pressed elastically against the spherical valving element 5 by a circumferential series of springs 7 (only one spring is visible in the figures) interposed permanently between the valve seats 6 and the valve body 1 there is a valve seat shifting device divided into two identical portions 8, one for each valve seat (the figures show only that portion of the device relative to the valve seat on the same side as the inlet duct 3). Each portion 8 consists of a stop ring 9 concentric with and external to a seat shifting ring 10 which cooperates with the relative valve seat 6. More specifically, the stop ring 9 is made removably rigid with the valve body 1 by two sectors 11 (see specifically FIG. 3 which shows a single sector) which are inserted in a freely slidable manner into a nearly circumferential groove (it is lacking at the cap 4) consisting of the two nearly circumferential half-grooves 12 and 13 provided in opposing positions in the valve body 1 and in the stop ring 9 respectively. This latter acts as an outer guide for the axial sliding of said seat shifting second ring 10 from an active position or a repositioning (see the position of FIGS. 2 and 3) to a withdrawn position to extract the valving element 5, and vice versa, and defines with the second ring 10 a first variable chamber 14 which can be pressure-fed via a feed and discharge channel 15 provided within the stop ring 9 (see specifically FIG. 2). Said first variable chamber is sealed by one O-ring 16 and two O-rings 17 and 18. Said seat shifting second ring 10 comprises a circumferential shoulder tooth 19 for the valve seat 6 to which it is connected via an O-ring 19' and acts as an abutment for said circumferential series of valve seat springs 7. It also defines with the valve body 1 a second variable chamber 20 which can be pressure-fed via a second feed/discharge channel 21 provided within the valve body 1. When in said active position or repositioned, the seat shifting second ring 10 is locked in position by two sectors 22 (see specifically FIG. 3 in which only one is shown) which are inserted freely slidable within a nearly circumferential groove (which lacks in correspondence with the cap 4) consisting of two half-grooves 23 and 24 provided in opposing positions in the valve body 1 and in the seat shifting second ring 10.

The method of operating such a device is now apparent. To extract the valving element 5 it is necessary merely to open the cap 4 of the top entry ball valve and, in each portion 8 of the device, extract the two sectors 22 from the half-grooves 23 and 24, so as to release the seat shifting second ring 10, and then feed pressure through the first feed/discharge channel 15 and into said first variable chamber 14. In this manner, the two second rings 10 of the device withdraw, ie the ring 10 of FIGS. 2 and 3 moves towards the left to drag with it, by the effect of the friction of the sealed slide ring 19', the valve seat 6 which hence withdraws from the valving element 5. When the maintenance or repair has been carried out and the valving element 5 has been reinserted, pressure is fed into the second variable chamber 20 to return the second ring 10 and the relative valve seat 6 into the operating region, then having reinserted the sectors 22 into the grooves 23, 24, and reclosed the cap 4, the top entry ball valve is ready for operation.

We claim:

1. A device for shifting the seats of a top entry ball valve comprising a valve body provided with an inlet duct, an outlet duct and an upper closure cap, the said inlet and outlet ducts being each provided with a seal carrier ring or valve seat, which are elastically pressed by series of springs against the spherical valving element, characterised by consisting of, inserted permanently into said valve body as an integral part of the valve, two identical portions, one for each valve seat, which are interposed between said valve body and the relative valve seats, each portion of the device being formed from a stop ring which, made rigid with the valve body by first locking means, acts as an external guide for the axial sealed sliding, via an O-ring, of a seat shifting second ring of said portion which, coaxial to and cooperating with the relative valve seat via at least one O-ring, is moved, together with said valve seat by friction, by a first operating means, into a withdrawn position to enable said valving element to be extracted and, by a second operating means, into an active position or a repositioning of the valve seat, said seat shifting second ring being maintained in said active position by second removable locking means.

2. A device as claimed in claim 1, characterised in that said first locking means for making said stop ring rigid with said valve body consist of two sectors which are inserted in a freely slidable manner into a nearly circumferential groove formed from two half-grooves provided in opposing positions in the valve body and in the stop ring.

3. A device as claimed in claim 1, characterised in that said first operating means for moving said seat shifting second ring and hence the relative valve seat into a withdrawn position to enable the valving element to be extracted, consists of a variable chamber bounded by said stop ring and by said seat shifting second ring, said chamber being subjectable to pressure via a feed and discharge channel provided within the stop ring.

4. A device as claimed in claim 1, characterised in that said second operating means for moving said seat shifting second ring and hence the relative valve seat into an active position or a repositioning of the valve seat, consists of a second variable chamber bounded by said valve body and by said seat shifting second ring, said second chamber being subjectable to pressure via a feed and discharge channel provided within the valve body.

5. A device as claimed in claim 1, characterised in that said second removable locking means for maintaining said seat shifting second ring in said active position consist of two sectors which are inserted freely slidable into a nearly circumferential groove consisting of two half-grooves provided in opposing positions in the valve body and in the seat shifting second ring.

* * * * *